Patented May 10, 1949

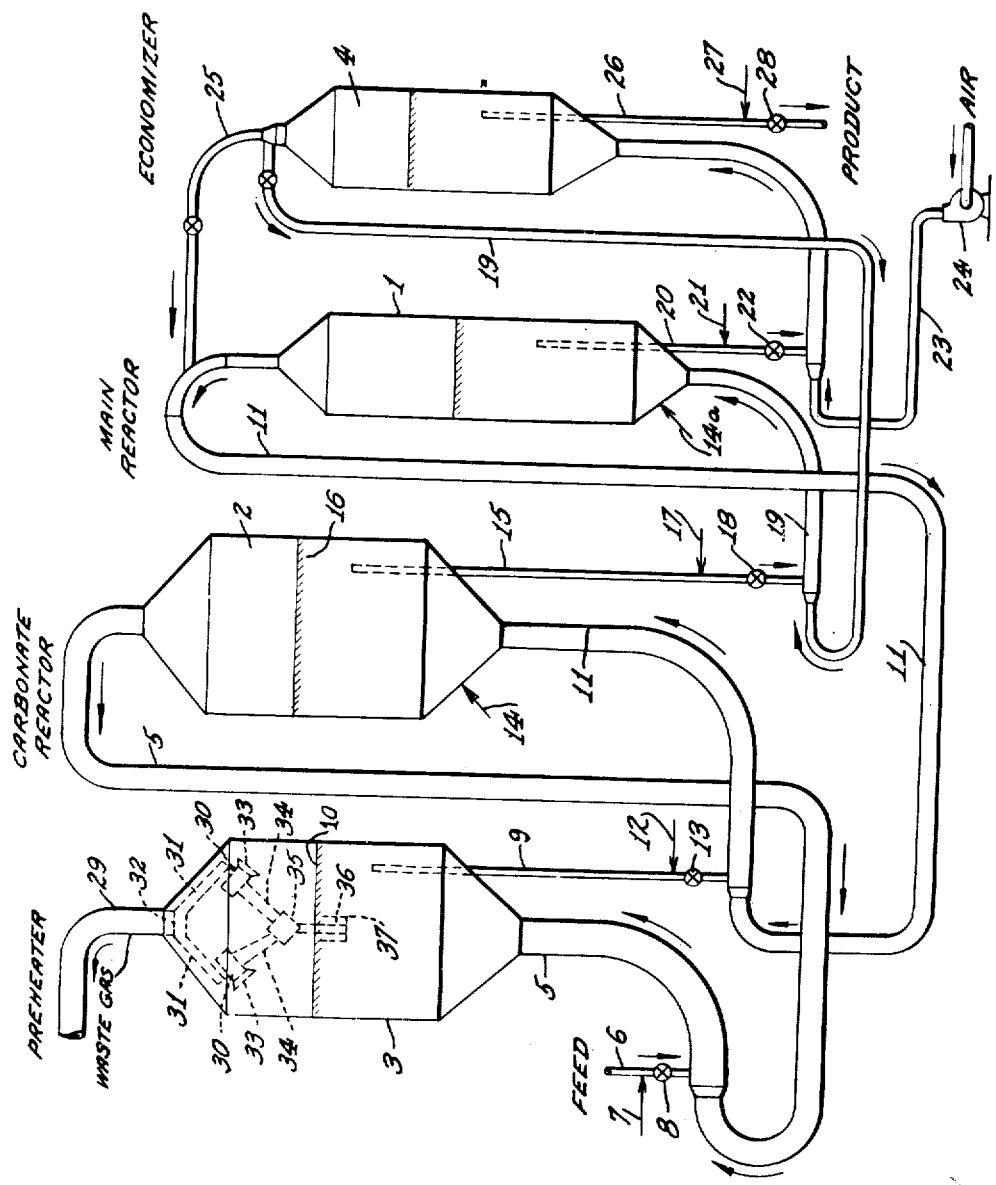

2,469,989

UNITED STATES PATENT OFFICE 2,469,989

PROCESS OF FORMING CHEMICAL REACTION PRODUCTS OF METAL OXIDES

Robert Pyzel, New York, N. Y., assignor to The M. W. Kellogg Company, Jersey City, N. J., a corporation of Delaware Application August 19, 1944, Serial No. 550,298

15 Claims. (Cl. 106—100)

This invention relates to an improved method for producing compounds of oxides of metals of group II of the periodic system with at least one oxide of a metal of groups III and IV. More particularly the invention relates to an improved method of reacting oxides of metals of group II with oxides of metals of groups III and IV. Still more particularly the invention relates to an improved process for reacting alkaline earths, such as calcium oxide and magnesium oxide with oxides of metals of groups III and IV, such as alumina and silica. Still more particularly, the invention relates to an improved method for reacting alkaline earths with silica and alumina to produce hydraulic cements.

The compounds produced in accordance with the improved process include primarily the silicates and aluminates of alkaline earth metals, which are hydraulic. The production of such hydraulic compounds represents the most important application of the improved process. The process will, therefore, be described particularly by reference to the production of hydraulic cements, as exemplified by Portland cement. It will be understood, however, that the reference to the production of Portland cement in the further description of the invention merely exemplifies an important application of an improved method which is capable of other embodiments, as will be apparent to those skilled in the art.

The most important constituent of Portland cement is calcium silicate which is present in the usual commercial product in the form of tricalcium silicate and also in the form of dicalcium silicate. Another important ingredient of Portland cement is tri-calcium aluminate, which is thought to impart setting properties to the cement.

Portland cement is made ordinarily from any raw materials which provide CaO, $SiO_2$ and $Al_2O_3$ in the desired proportions. In certain uses of Portland cement iron oxide is considered as a valuable ingredient, as is magnesia. Iron oxide serves somewhat as a replacement for $Al_2O_3$ but also imparts its own peculiar properties to the cement. Magnesia likewise may replace CaO in part but also imparts its own characteristic properties to the cement.

In the United States the principal raw material employed in the manufacture of Portland cement is cement rock which is an argillaceous limestone containing CaO, $SiO_2$ and $Al_2O_3$ in almost the proportions ordinarily desired in Portland cement. Small amounts of lime or clay may be added to make any necessary adjustment of the proportion of these oxides in the raw material. Another important raw material which is employed in the United States is marl which is an impure calcium carbonate containing clay and magnesia. This also is used in combination with clays or limestone to produce the desired proportions of the essential ingredients for the Portland cement. It is to be understood, however, that Portland cement may be produced from any raw materials containing the CaO, $SiO_2$ and $Al_2O_3$ which are regarded as the essential constituents of Portland cement. In previous commercial operations the raw materials are finely ground and burned in a rotary kiln into which they are introduced either as a powder or as a slurry. The raw materials are burned in the rotary kiln in the well-known manner and emerge as clinker which is then ground to produce the cement produce.

It is an object of this invention to provide an improved process for treating the raw materials ordinarily employed in the production of hydraulic cement which requires a substantially lower expenditure of fuel than previous methods and which produces a cement product of greater uniformity than the product of previous processes. It is the general object of the invention to provide an improved process for reacting oxides of metals of group II, particularly alkaline earths, with oxides of metals of groups III and IV, such as silica and alumina, under conditions requiring the expenditure of a minimum amount of fuel and which facilitate the formation of a highly uniform product. Other objects and advantages of the invention will be apparent from the following description.

In accordance with the improved process of this invention the raw materials are formed into a fine powder, which may be finer than the powder previously employed in the rotary kiln method, and the powder is subjected to reaction conditions in a reactor while being maintained in a relatively dense pseudo-liquid condition in the reactor by the passage of a gas upwardly through the powder mass at the proper velocity. The powdered raw material may be charged to the reactor in the chemical form in which it is customarily charged to a rotary kiln or the powdered raw material may be subjected to a preliminary burning in a separate zone to convert the calcium carbonate to calcium oxide.

The heat necessary to sustain the reaction may be supplied with the stream of gas, or fuel may be introduced directly into the fluidized powdered mass and burned therein to provide the necessary heat. It is more economical of heat and conducive to the preparation of a uniform product to subject the raw material to a preliminary treatment in a separate chamber to convert the calcium carbonate to calcium oxide. It is characteristic of this invention that the reaction zone is maintained at a substantially uniform temperature throughout as a result of the circulation of the powdered particles throughout the fluidized mass of reactants. Consequently it is preferable to convert the calcium carbonate to calcium oxide in a separate preliminary treatment since this operation is best carried out at a temperature considerably lower than the temperature necessary for reacting the calcium oxide with silica and alumina to produce the hydraulic product. While such separate preliminary treatment is necessary only for that portion of the raw material containing calcium carbonate it will be found convenient ordinarily to subject the whole raw material to such preliminary treatment, since calcium carbonate ordinarily comprises the greater part of the raw material.

In accordance with the improved process the finely divided raw material, which may or may not have been treated previously to convert the carbonate to the oxide, is suspended in the reactor in an upwardly flowing gas stream as a dense, pseudo-liquid turbulent mass in which the powder particles circulate at a high rate to produce intimate mixing of the mass of reactants. The gas stream is passed upwardly through the mass at a velocity which is sufficient to maintain the reactants substantially in suspension in the gas stream. The velocity of the gas stream is maintained sufficiently low to maintain the greater part of the mass of reactants in a pseudo-liquid condition in which it exhibits many of the properties of a true liquid, particularly as to flowability and density. At the same time the velocity is maintained sufficiently high to produce in the relatively dense pseudo-liquid mass of finely divided reactants a highly turbulent motion of the particles whereby they circulate at a high rate throughout the pseudo-liquid mass.

The fluidized mass of reactants is quite dense, resembling in this respect a settled mass of the same material. The density of the fluidized mass may be not less than half that of the settled mass. While the dense turbulent reactant mass is said to be suspended in the gas stream this does not imply any movement of the mass as a whole along the path of flow of the gas stream. The mass of finely divided reactants is suspended in the gas stream but not entrained therein, although a portion of the suspended solid may be carried away from the dense fluidized mass by becoming entrained in the gas stream emerging from the dense pseudo-liquid mass.

The gas mixture is introduced into the reactor through an inlet in the bottom thereof whereby the gas stream passes upwardly through the mass of reactants to be maintained in a fluidized condition. Conveniently the inlet comprises one or more connections whose aggregate cross-sectional area is substantially less than the corresponding dimension of the space in which the fluidized mass of reactants is to be maintained. The gas stream thus passes into the reactor at a relatively high velocity which prevents the passage of solids out of the reactor against the entering gas stream. Inside the reactor the velocity of the gas stream decreases to the rate necessary to produce the desired degree of fluidization of the mass of reactants. For convenience the velocity of the gas stream in the reactor is given in terms of the theoretical velocity of the gas stream through an empty reactor and referred to hereafter as the superficial velocity. It is evident, however, that the velocity of the gas stream decreases to the superficial velocity only if the reactor is sufficiently larger than the volume of fluidized reactants to permit the maximum possible disengagement of the gas stream and the suspended solids. As the concentration of finely divided solids in the fluidized mass varies from a maximum at the bottom to a minimum at the top the linear velocity of the gas stream would normally decrease as it passes upwardly through the fluidized mass, in the absence of reaction. The extent of the variation in the density of the fluidized mass in the reactor is affected by the superficial velocity, the greatest variation in the density of the mass being observed at relatively high superficial velocity. The linear velocity of the gas stream may be affected also by the change in volume of the gas stream, as it passes up through the reactor, as a result of an increase in temperature of the gas stream and as a result of the formation of gases by the reaction.

If the reactor is somewhat larger than the volume occupied by the fluidized mass of solid reactants the solids in the reactor appear to be distributed in two visually distinct phases. The first of these is the relatively dense, pseudo-liquid mass of fluidized finely divided reactants, previously described, which occupies the lower portion of the reactor and comprises all but a minor proportion of the solids in the reactor. This phase is designated as the dense phase. The second phase, which occupies the upper part of the reactor, is a diffuse phase in which the concentration of solids is far less, and of a different order of magnitude, than the average concentration in the dense phase. The diffuse phase may be said to be a disengaging zone in which the solids lifted above the dense phase by the gas stream are disengaged therefrom to the extent that such solids are present in excess of the carrying capacity of the gas stream at the minimum velocity reached by the gas stream in the reactor. Between the dense phase of high concentration and the diffuse phase of low concentration there is a relatively narrow zone in which the the concentration of solids changes in a short space from the high concentration of the dense phase to the low concentration of the diffuse phase. This zone has the appearance of an interface between two visually distinct phases.

While the invention includes within its scope the use of reactants of a sufficiently large particle size such that substantially no part of the reactants is carried by entrainment in the gas stream at the maximum superficial velocity, the preferred method of operation involves ordinarily the use of finely divided reactants and operating conditions such that a portion of the reactants is carried by entrainment in the gas stream at the superficial velocity. This results from the fact that finely divided reactants are desirable as presenting a greater ratio of surface to volume and, thus affording the maximum efficiency of reaction and maximum heat transfer between particles, and from the further fact that sufficient mixing of the mass of finely divided reactants ordinarily requires the use of superficial velocities which entrain a portion of the finely divided solids in the gas stream. In this preferred method of operation mere settling is not sufficient to disengage all the solids from the gas stream emerging from the dense phase in the reactor. Hence it may be necessary to provide means to separate entrained solids from the gas stream emerging from the reactor.

The gas stream is withdrawn from the top of the reactor through an exit which is ordinarily of substantially smaller cross-sectional area than the reactor. This provides a high velocity outlet for the gas which is surrounded by an area in which the gas velocity accelerates. The nearer this zone of accelerating gas velocity is to the dense phase the greater is the concentration of solids in the gas stream entering the zone and the greater is the quantity of solids which is carried out of the reactor in the exit gas stream. This quantity approaches the carrying capacity of the high velocity exit gas stream when it is desired to maintain the upper level of the dense phase in the vicinity of the zone of accelerating velocity. In the preferred method of operation, however, the reactor is made sufficiently larger than the required volume of the dense fluidized mass of solids to provide a relatively large diffuse phase in which substantial disengagement of solids from the gas stream occurs by mere settling.

The operation is initiated by charging the reactor with a quantity of finely divided solid reactants which it is expected will be equivalent to the mass of solids maintained in the reactor in the dense phase. Thereafter the passage of the gas stream into the reactor and upwardly through the mass of solids is initiated at the velocity which fluidizes the mass, i. e., converts it to the relatively dense pseudo-liquid condition involving highly turbulent motion of the particles. Alternatively the highly turbulent pseudo-liquid phase may be established in the reactor initially by flowing the gas stream through a substantially empty reactor and charging the finely divided solid reactants into the reactor at a rate greater than the carrying capacity of the gas stream at the superficial velocity imposed by the dimensions of the reactor. As a result of this excess loading of the gas stream the desired dense phase is gradually built up in the reactor. When the height of the dense phase in the reactor reaches the desired level the introduction of reactants into the reactor is carried on at a reduced rate or is stopped, in accordance with the desired method of operation.

If the reactants charged to the reactor are substantially free of carbonates, whereby there is no necessity for conversion of carbonates to oxdes in the reactor, the net heat effect of the desired reactants is exothermic. In that case it is necessary only to heat the reaction mass to a temperature at which reaction is initiated. Thereafter the heat of reaction must be absorbed to avoid overheating the mass of reactants. The heat of reaction may be absorbed by the gas stream and the solid reactants, which may be introduced into the reactor at temperatures substantially lower than the reaction temperature level and which are necessarily withdrawn from the reactor at approximately the reaction temperature level. It is a feature of the improved method of operation that the reaction mass is maintained substantially at a uniform temperature regardless of the heating and cooling means applied to it and regardless of the introduction and withdrawal of solid reactants and gas. It is necessary only to balance the heat absorption by these means against the exothermic heat of reaction and any supplementary heating means to maintain the entire fluidized mass of reactants at a desired uniform reaction temperature level.

If the reactants charged to the reactor contain a substantial proportion of carbonates, whereby it is necessary to convert such carbonates to oxide in the reactor with the evolution of carbon dioxide the net heat effect of the reactions may be endothermic. In that case it is necessary continuously to supply substantial heat to the reactor to maintain the fluidized mass of reactants at the desired reaction temperature level. To supply heat to the reaction, or to effect the preliminary heating of the reaction mass to the reaction temperature, any suitable heating means may be employed. Conveniently fuel may be injected directly into the reactor and burned by means of oxygen in the gas stream. Such fuel may be in the form of a combustible gas, such as natural gas, a combustible liquid, such as petroleum oil, or finely divided solids, such as coal or coke. Alternatively combustion may be carried out in a separate chamber from which the hot gases pass into the reactor to effect simultaneous aeration and heating of the mass. The use of finely divided solids, injected directly into the reactor, is an efficient heating means in operations in which the ash resulting in such combustion can be tolerated in the product. For example, finely divided coal, which may be in a particle size approximating that of the reactants, is intimately mixed with the fluidized mass as the result of the high circulation rate of the particles thereof and is burned uniformly throughout the fluidized mass by oxygen contained in the gas stream employed for effecting fluidization. In this manner uniform heating of the mass is effected.

The use of the gas stream to effect combustion as well as to effect aeration introduces another factor to govern the volume of such gas introduced into the reactor. To produce the required amount of heating it may be necessary to employ a quantity of gas, such as air, in excess of the minimum amount necessary to effect fluidization, in order to supply sufficient oxygen for combustion in the reactor.

The mass of reactants may be maintained in the reactor at the desired reaction temperature without the addition or withdrawal of the reactants for a time sufficient to effect desired reaction. Thereafter the product may be withdrawn from the reaction and replaced with fresh reactants. Preferably, however, a small proportion of the fluidized mass of reactants is withdrawn continuously from the reactor and continuously replaced with fresh reactants. This proportion is regulated to provide an average residence time sufficient to effect complete reaction whereby the material continuously withdrawn from the reactor consists substantially completely of the desired reaction product.

In accordance with a preferred modification of the invention raw materials comprising substantial proportions of carbonates are treated in two reaction stages. In this method of operation the reactants are introduced into a first stage, maintained under the above described fluidized conditions, in which the temperature is maintained at the level necessary to convert the carbonates to oxides. Since this reaction is highly endothermic it is necessary to supply a substantial quantity of fuel continuously to this stage. The product of this operation then passes to a second treating stage, corresponding to the reaction zone described above, in which the fluidized mass is maintained at the temperature necessary to form the desired cement product. As the reactions occurring in this stage are exothermic it is necessary to supply only a relatively small amount of heat to the reaction mass. The heat of reaction is absorbed in heating the entering reactants and gas stream.

To produce the turbulent pseudo-liquid condition in the dense phase it is desirable that at least a substantial proportion of the mass of reactants shall consist of particles whose free settling rate is less than the superficial velocity in the reactor, whereby such particles are capable of being entrained in the gas stream. The mass of reactants may consist advantageously of a mixture of particles varying in size from 40 to 400 microns (average diameter). However, particles of smaller or larger diameter may be present. The gas stream may be charged to the reactor at a rate corresponding to a superficial velocity of 0.1 to 10 feet per second, depending upon the degree of turbulence desired and on the necessity for extra oxygen for combustion purposes to maintain a highly fluidized mass of solids at a uniform temperature. A minimum superficial velocity of approximately 0.5 foot per second is necessary for most purposes and velocities between that figure and 1.5 feet per second will be found useful.

The gas employed for fluidization may be any gas which does not contain ingredients which effect undesired reactions in the reactor. Ordinarily air is highly satisfactory as it is substantially non-reactive with the reactants and contains oxygen which may be used to support any desired combustion in the reactor. It is evident, however, that any suitable gas may be employed.

The invention includes within its scope a process arrangement for handling the raw material and the product in a manner which is most economical of heat. This may include the provision of heat exchangers such as chambers in which the reactants are maintained in the finely divided fluidized condition and through which the finely divided solids flow in a continuous or semi-continuous manner. This arrangement, and the improved process in general, will be described further and in more detail by reference to the accompanying drawing which is a diagrammatic representation of apparatus for carrying out one modification of the improved process.

Referring to the drawing a main reactor 1 is provided for carrying out the treatment of a fluidized raw material substantially free of carbonates in the manner generally described above. A preliminary carbonate reactor 2 is provided for effecting a preliminary conversion of carbonates to oxides in the manner generally described above. A preheater 3 is provided for preheating the raw material charged to the carbonate reactor by contact with waste gases from the latter. An economizer 4 is provided to preheat the gas stream charged to the main reactor, or to the carbonate reactor, by contact thereof with the hot product of the process. In the specific modification of the invention illustrated by the drawing preheater 3 and economizer 4 are operated in a manner to maintain the reactants or product in a fluidized condition. It will be understood, however, that this is not necessary in accomplishing the functions of these parts of the process and that any equivalent heat saving means may be employed.

The waste gas stream from carbonate reactor 2 passes through line 5 to the bottom of preheater 3. The finely divided raw material, which may comprise a mixture of finely ground cement rock and clay or limestone, is introduced into preheater 3 by any suitable method. The finely divided reaction mass may be charged directly into preheater 3 through a suitable opening (not shown prior to initiating the passage of the gas stream therethrough or preheater 3 may be charged with reactants through line 6 which connects line 5 with a suitable supply source. The finely divided reactants are supplied through line 6 to the gas streams passing through line 5 at the rate at which such solids can be carried by the gas stream upwardly into preheater 3. In this manner the formation of the dense fluidized mass is effected. When a sufficient volume of the dense phase has been produced in preheater 3 the rate of charging of fresh feed through line 6 is adjusted to correspond to the rate at which it is desired to transfer preheated raw material from preheater 3 to carbonate reactor 2.

The finely divided reactants are introduced through line 6 by any suitable means but preferably in the form of a mass which is maintained in a fluidized condition. To assist in maintaining this condition an aerating gas may be introduced into line 6 through line 7. This aerating gas may be any suitable gas such as air or waste gas or steam and may pass either upwardly in line 6 or downwardly therein or in both directions. A valve 8 is provided in line 6 to regulate the rate at which solids are introduced into line 5 from line 6. The section of line 5 between line 6 and preheater 3 may be enlarged in accordance with the increased volume resulting from the addition of solids and to obtain reduced velocity of the gas stream which may be desirable after the introduction of solids therein.

In preheater 3 the waste gas and the mass of raw materials is brought to a substantially uniform temperature by permitting a sufficient residence time of the solids in preheater 3. The preheated raw material may be withdrawn from preheater 3 in any suitable manner and from any point thereof for transfer to carbonate reactor 2. Conveniently, however, this is effected by means of a vertical standpipe 9 which extends upwardly into preheater 3 to a height substantially below the level of the interface at 10. Standpipe 9 connects at its lower end with line 11 through which hot gases from reactor 1 and economizer 4 are passed into the lower part of carbonate reactor 2. The fluidized preheated raw materials flow into the upper end of standpipe 9 and pass downwardly therethrough into line 11. The flow of such solids through standpipe 9 may be regulated and assisted by means of aerating gases introduced through line 12. A valve 13 is provided in standpipe 9 to regulate the flow of solids into line 11. Line 11 is suitably enlarged between standpipe 9 and carbonate reactor 2.

The hot gases passing through line 11 will further preheat the raw material to the temperature necessary to effect conversion of carbonates to oxide and may supply a part of the endothermic heat of reaction. The remainder of the heat of reaction is supplied by the introduction of fuel or by other heating means in accordance with the general methods described above. The introduction of fuel directly into carbonate reactor 2 by a pipe line or by a screw conveyer or by any other means is indicated diagrammatically at 14. The volume of gas introduced into carbonate reactor 2 through line 11 ordinarily is somewhat greater than the minimum necessary to effect fluidization of the mass of reactants therein since it is necessary ordinarily to supply additional oxygen to support combustion of the fuel supplied at 14. In any case the mass of reactants in carbonate reactor 2 is maintained in a highly turbulent condition in which the heat exchange between the various parts of the turbulent mass is highly efficient whereby the mass is substantially at a uniform temperature. The hot gases pass from the top of carbonate reactor 2 through line 5 which connects with the bottom of preheater 3 in which the waste gases are contacted with incoming fresh feed as a heat saving measure.

A standpipe 15, similar in operation to standpipe 9, is provided to withdraw reactants from carbonate reactor 2. The rate of withdrawal of reactants through standpipe 15 is adjusted to maintain an average residence time of the reactants in the carbonate reactor 2 substantially greater than the time necessary to effect the reaction. As a result the product withdrawn through standpipe 15 for transfer to main reactor 1 is substantially free of carbonates. The rate of withdrawal of reactants through standpipe 15 is adjusted also to maintain an interface 16 about half way up in carbonate reactor 2. This permits substantial disengagement of solids from the gas stream prior to passage of the latter to line 5. Fluidizing gases are introduced into standpipe 15 at 17 and a valve 18 is provided to regulate the flow of reactants.

The lower end of standpipe 15 connects with line 19 which extends from the top of economizer 4 to the bottom of the main reactor 1. Through line 19 there is introduced into reactor 1 the gas stream necessary to fluidize the mass of reactants. This gas stream and the reactants introduced therein from standpipe 15 are at temperatures substantially lower than the reaction temperature level desired in reactor 1. However, the gas stream and accompanying reactants entering reactor 1 from line 19 are preheated to the desired reaction temperature by the highly turbulent fluidized mass of reactants in reactor 1, which is maintained at the desired reaction temperature level by the exothermic heat of reaction and by a small quantity of fuel introduced through line 14a in a manner similar to the supply of fuel to the carbonate reactor as described above. The exothermic heat of reaction and the requirements of the process as to volume of fluidizing gas and quantity of reactants charged are such that ordinarily the entire heat of reaction is absorbed by the reactants and fluidizing gas introduced from line 19 into reactor 1.

The reaction product is withdrawn continuously from reactor 1 through a standpipe 20, the rate of withdrawal being adjusted to maintain the interface at the desired level and to provide a holding time of reactants in reactor 1 substantially greater than the time necessary to effect the reaction. The hot gases from reactor 1 pass through line 11 to carbonate reactor 2. Line 11 also receives a part of the gases emerging from economizer 4. This serves to reduce the temperature of the gas from reactor 1 to a level more suitable for transmission to reactor 2 and also to supply the extra oxygen necessary to support combustion in reactor 2.

Standpipe 20, which is provided with aerating means at 21 and a valve 22, connects at its lower end with line 23 through which air for the process is introduced into the bottom of economizer 4. A compressor 24 is provided in line 23 to impose the necessary pressure on the system. The hot product passes downwardly through standpipe 20 into line 23 where it is picked up by the air stream and carried into economizer 4. In economizer 4 the fluidized mass of the product is maintained to permit effective contact between the air and product. The quantity of air introduced into the system through line 23 is regulated by the requirements of carbonate reactor 2 and reactor 1. Since this requires a quantity of air which is greater than the amount necessary to fluidize the reactants in reactor 1 the preheated air emerging from the top of economizer 4 is divided between line 19 which passes to the bottom of reactor 1 and line 25 which connects with line 11.

The partially cooled product is withdrawn from economizer 4 in a fluidized condition through standpipe 26 which is provided with aerating means 27 and a valve 28. This product may, if desired, be passed to a second economizer or other heat saving means.

The waste gas which passes from the system through line 29 at the top of preheater 3 may be treated for the recovery of solids entrained therein. Suitably this gas is passed through separatory means such as cyclone separators and the solids thus separated are returned to preheater 3. Conveniently such separating means may be placed within preheater 3 and the upper portion thereof in the manner shown diagrammatically in the drawing. A plurality of cyclone separators 30 may be maintained in series, or in parallel, in the upper portion of preheater 3. In the arrangement shown the cyclones are connected by lines 31 to a common header 32 which communicates with line 29. The gas in the upper part of preheater 3 passes into the inlets 33 of cyclones 30, deposits all or a substantial proportion of the entrained solids therein and passes out of the system through lines 31 and 29. The separated solids pass from cyclones 30 through lines 34 to a header 35 from which the returned solids pass downwardly through line 36 to a point substantially below interface 10. A shield 37 may be placed around the lower end of line 36 to minimize the passage of gases into the open end of line 36.

The provision of solids recovery means in combination with preheater 3 is advantageous in that it minimizes for the whole system the loss of solids. Furthermore, preheater 3 represents the only place in the system in which the gas temperature is sufficiently low to make practicable the application of recovery means, such as cyclones. Ordinarily this requires that the temperature be not substantially higher than 1000° F.

The solids which are carried out of reactors 1 and 2 and economizer 4 by entrainment in the gas streams passing overhead are recovered in the succeeding chamber to which the exit gas stream passes. Thus solids carried overhead by entrainment through line 5 are recovered in preheater 3 and returned to reactor 2 through standpipe 9. Also solids entrained in the gas stream in line 11 are recovered in reactor 2 and returned to reactor 1 through standpipe 15. In a similar manner solids carried overhead from economizer 4 through lines 19 and 25 are recovered in reactor 1 and in reactor 2 and returned through standpipes 20 and 15 respectively.

The pressure on the system need be no higher than the pressure necessary to pass the gas stream through the system plus the pressure necessary at 29 to dispose of the waste gas. The pressure at which the air is supplied through line 23 may be in the order of 37 pounds gage which is sufficient to fluidize the solids in the four chambers, pass solids through the system and pass the waste gas out through line 29 at a pressure somewhat above atmospheric.

The temperature in main reactor 1 is maintained at a substantially uniform level within the range of 2,000–2,650° F. In accordance with a preferred modification of this invention the main reactor is maintained at a temperature below the temperature at which fusion of the solids would occur or in the range of 2,000–2,450° F. The maximum temperature permissible without substantial fusion is most desirable.

The temperature in carbonate reactor 2 is maintained at the level necessary to effect rapid conversion of the carbonates such as calcium carbonate to corresponding oxides. For this purpose a temperature of approximately 1650° F. is satisfactory although somewhat lower temperatures may be employed.

The temperatures in preheater 3 and economizer 4 have no bearing on the reaction and are governed entirely by considerations of efficiency in heat saving. Examples of such temperatures will be given in the following example.

An example of the operation of the process described above will be given in the following description of the operation of a plant designed and operated to produce 735 tons per day of a Portland cement comprising a mixture of dicalcium silicate, tricalcium silicate, tri-calcium aluminate and small amounts of iron oxide, magnesia and other minor ingredients. This material is produced from a raw material consisting essentially of silica, alumina and calcium carbonate and ground sufficiently fine that 90% of the powder will pass through a number 1000 sieve. Analysis of this powder is as follows:

| | Weight per cent |
|---|---|
| Silica | 14.0 |
| Alumina and iron oxide | 6.7 |
| Calcium carbonate | 74.8 |
| Magnesium carbonate | 1.2 |
| Combined water | 0.6 |
| Miscellaneous | 2.7 |
| Total | 100.0 |

This powder has a specific heat, in the range of 60–1,650° F. of about 0.25 B. t. u. per °F. per pound and has a filling weight of 50 pounds per cubic foot.

The above described feed powder is charged to the system at a temperature of about 60° F. through line 6 at the rate of 95,000 pounds per hour. At the same time 107,000 pounds per hour of gas at 1,650° F. is passed through line 5 into preheater 3. The inside diameter of line 5 between line 6 and preheater 3 is dimensioned with respect to the volume of gas passing therethrough to provide a linear velocity in that part of line 5 of approximately 50 feet per second. The resulting dense bed of charged material in the preheater 3 is thus heated to a temperature of about 850° F. and the waste gas is withdrawn through line 29 at about the same temperature. Preheater 3 has an inside diameter of approximately 25 feet and the dense phase maintained therein occupies about half the volume of that chamber or about 7,360 cubic feet. The gas flow corresponds to a maximum superficial velocity of about 1.5 feet per second and an average density in the dense phase of approximately 22 pounds per cubic foot is obtained. The dense phase provides even distribution of gas flow and effects sufficient heat exchange with the waste gas.

The preheated feed powder is withdrawn from preheater 3 through standpipe 9 at the rate of 95,000 pounds per hour. At the same time hot gas from reactor 1 and economizer 4 is passed through line 11 into the bottom of carbonate reactor 2 at the rate of 67,585 pounds per hour and at a temperature of approximately 1,600° F. That part of line 11 through which the resulting mixture of powder and gas flow to reactor 2 is dimensioned to provide a velocity of 50 feet per second. Carbonate reactor 2 has an inside diameter of 27 feet and provides a dense phase depth of approximately 15 feet. This occupies about one-half the volume of the carbonate reactor. In carbonate reactor 2 the reaction temperature of 1,650° F. is maintained throughout by the introduction of 5,886 pounds per hour of powdered coal. The oxygen necessary to support combustion is contained in the gas introduced through line 11. The resulting intermediate product powder has a filling weight of approximately 60 pounds per cubic foot whereby the average density of the dense phase in carbonate reactor 2 is about 27 pounds per cubic foot. The average holding time for the powder in reactor 2 in accordance with the conditions outlined above is approximately 2.6 hours.

The product of the combustion which takes place in the dense phase of the carbonate reactor, approximately 73,000 pounds per hour, together with the carbon dioxide liberated, approximately 34,000 pounds per hour, are discharged from carbonate reactor 2 through line 5.

The powdered intermediate product is withdrawn from reactor 2 through standpipe 15 at the rate of approximately 61,221 pounds per hour (including 471 pounds per hour of ash). This powder is picked up in line 19 by preheated air from economizer 4 which flows through line 19 at the rate of 26,310 pounds per hour at 1,100° F. That part of line 19 through which the resulting mixture passes is dimensioned to provide a linear velocity of 40 feet per second. Reactor 1 is dimensioned to provide an average holding time of approximately three hours. Consequently reactor 1 has an inner diameter of approximately 16 feet and the dense phase is maintained at a height of approximately 27 feet. In order to maintain a reaction temperature of approximately 2,350° F. the heat of reaction must be supplemented. For this purpose 750 pounds of powdered coal per hour are charged to reactor 1 in any suitable manner to maintain the reaction temperature at the desired level. The fluidized powder in reactor 1 has an average density in the dense phase of approximately 36 pounds per cubic foot.

The product powder is withdrawn from reactor 1 through standpipe 20 at the rate of approximately 61,281 pounds per hour (including 531 pounds per hour of ash). This material is passed into line 23 at a temperature of about 2,350° F. where it is picked up by air which is supplied by compressor 24 at the rate of 66,895 pounds per hour. This air, which is at a temperature of 220° F., and the product powder are contacted sufficiently in economizer 4 to preheat the air to a temperature of 1,100° F. For this purpose economizer 4 has an inside diameter of 14.5 and the fluid bed height is maintained at approximately 15 feet. The product powder, at a temperature of 1,100° F., is withdrawn through standpipe 26 at the rate of about 735 tons per day. The preheated air is divided at the top of economizer 4 to provide the volume of air required for reactor 1, which flows through line 19, and the remainder is passed through line 25 to line 11 and into admixture with the hot gases from reactor 1. This mixture has a temperature of about 1,600° F.

The foregoing operating conditions involve passing the gas streams through the various vessels at a maximum superficial velocity of 1.5 feet per second. Air is introduced through line 23 at a pressure of approximately 37 pounds gage at the exit of compressor 24. As a result of the pressure drop in line 23 the pressure is reduced to 30.5 pounds per square inch in the bottom of economizer 4. The pressure drop caused by the dense bed in economizer 4 reduces the pressure to 25.7 pounds per square inch. The pressure further declines in line 19 to 22.4 pounds per square inch in the bottom of reactor 1. The dense bed of reactants in that chamber reduces the pressure further to about 14.0 pounds per square inch in the top of that vessel. Likewise the pressure is further reduced in line 11 to a pressure of 10.8 pounds per square inch in the bottom of carbonate reactor 2 and this is further reduced to 8.0 pounds in the top of that reactor. In preheater 3 the pressure in the bottom of the vessel is about 4.7 pounds per square inch and at the entrance of cyclones 30 it is about 2.3 pounds per square inch.

The standpipes 9, 15, 20 and 26 are provided to effect transfer of solids from a zone of relatively low pressure in the vessels, in which the entrances of the standpipes are located, to transfer lines at relatively high pressures. This is accomplished by reducing the degree of aeration of the solids in the standpipes whereby the density of the material in the standpipes is greater than the density of the dense bed from which it receives its powder. For example, aeration of standpipe 9 is regulated to produce in the standpipe an average density of about 30 pounds per cubic foot. In addition standpipe 9 is provided with a length such that the pressure in the bottom of the standpipe is sufficient to overcome the pressure drop through valve 13 and provide a residual pressure at the exit of the valve sufficient to prevent the flow of gases upwardly into standpipe 9. For this purpose, in the apparatus described above, standpipe 9 is provided with a length of approximately 68 feet. Similarly the density of the powder in standpipe 15 and the length of the standpipe are regulated to provide a pressure of approximately 25.4 pounds per square inch at the exit of valve 18. This corresponds to a powder density in standpipe 15 of about 35 pounds per cubic foot and a length of the standpipe of about 81 feet. Standpipe 20 is provided with a length of about 400 feet and the density of the product powder therein is regulated at about 55 pounds per cubic foot to provide a pressure at the exit of valve 22 of about 33.5 pounds per square inch.

General interior dimensions only are indicated in the drawing but it is to be understood that extensive insulation is required to reduce radiation losses from the system to a minimum. It will be understood furthermore that the construction of the various vessels is necessarily governed by the operating temperatures. Reactors 1 and 2 are lined with suitable refractory materials to withstand the relatively high temperatures existing in those zones of reaction and it may be desirable also to provide such insulation for economizer 4. Preheater 3 may be constructed of sheet steel but considerable outside insulation is required for this vessel, and the others, to achieve maximum thermal efficiency in the system.

It may be desirable to replace valves 18 and 22 with suitable ceramic lined throats having a fixed interior dimension suitable for transferring solids at the desired rate. To adjust the rate of transfer of solids through such fixed openings the density of the powder in the standpipe may be adjusted by varying the degree of aeration. This in turn regulates the pressure in the bottom of the standpipe.

In the production of a Portland cement it is necessary ordinarily to subject the product withdrawn through standpipe 26 to additional grinding to provide a powder of the requisite fineness.

I claim:

1. A method for producing a compound of an oxide of a metal of group II and at least one oxide of a metal of groups III and IV which comprises flowing a gas stream upwardly in a reaction zone through a mass of finely divided solids containing said oxides to maintain the mass substantially in suspension in said stream, limiting the upward velocity of said gas stream to maintain the greater part of said mass of finely divided solids in a relatively dense pseudo-liquid phase in which the solid particles circulate at a high rate, maintaining said fluidized mass of solids at a temperature high enough to produce the desired reactions, passing said gas stream out of said reaction zone without substantial entrainment of said solids, cooling said gas stream outside said reactor to a temperature substantially lower than that of said reaction zone in a stepwise procedure comprising contacting said gas stream first with a second gas stream at a temperature substantially below the temperature of said reaction zone and then with a charge stream of said finely divided solids at a temperature substantially below the temperature of said second gas stream, treating said cooled gas stream to separate therefrom entrained solids, and returning said separated solids to said reaction zone.

2. A method for producing a compound of an oxide of a metal of group II and at least one oxide of a metal of groups III and IV which comprises flowing a gas stream upwardly in a reaction zone through a mass of finely divided solids containing said oxides to maintain the mass substantially in suspension in said stream, limiting the upward velocity of said gas stream to maintain the greater part of said mass of finely divided solids in a relatively dense pseudo-liquid phase in which the solid particles circulate at a high rate, maintaining said fluidized mass of solids at a temperature high enough to produce the desired reactions, removing a part of said fluidized mass of solids from said reaction zone independently of said gas stream, contacting said removed solids outside said reaction zone with a relatively cool gas stream to cool said solids and heat said gas stream, mixing at least a part of said heated gas stream with a preheated charge stream of said finely divided solids, and passing said mixture of gas and solids upwardly into said reaction zone.

3. A method for producing a hydraulic cement which comprises flowing a gas stream upwardly in a reaction zone through a mass of finely divided solids containing silica and calcium oxide to maintain the mass substantially in suspension in said stream, limiting the upward velocity of said gas stream to maintain the greater part of said mass of finely divided solids in a relatively dense pseudo-liquid phase in which the solid particles circulate at a high rate, and maintaining said fluidized mass of solids at a temperature substantially higher than 2000° F., withdrawing said gas stream from said first-mentioned reaction zone, introducing a mass of finely divided solids containing calcium carbonate into said withdrawn gas stream and passing the mixture of gas and solids upwardly into a second reaction zone to maintain the mass in said second reaction zone in said dense fluidized condition, maintaining said last-mentioned fluidized mass of solids at a temperature substantially lower than 2000° F. but sufficiently high to convert said calcium carbonate to calcium oxide, withdrawing a portion of the solids comprising said second-mentioned fluidized mass including calcium oxide, and introducing the same into said gas stream prior to passage thereof upwardly in said first-mentioned reaction zone.

4. A method for producing a hydraulic cement which comprises flowing a gas stream upwardly in a reaction zone through a mass of finely divided solids containing silica and calcium oxide to maintain the mass substantially in suspension in said stream, limiting the upward velocity of said gas stream to maintain the greater part of said mass of finely divided solids in a relatively dense pseudo-liquid phase in which the solid particles circulate at a high rate, and maintaining said fluidized mass of solids at a temperature substantially higher than 2000° F., withdrawing said gas stream from said first-mentioned reaction zone, introducing a mass of finely divided solids containing calcium carbonate into said withdrawn gas stream and passing the mixture of gas and solids upwardly into a second reaction zone to maintain the mass in said second reaction zone in said dense fluidized condition, maintaining said last-mentioned fluidized mass of solids at a temperature substantially lower than 2000° F. but sufficiently high to convert said calcium carbonate to calcium oxide, and transferring a portion of the solids comprising said second-mentioned fluidized mass including calcium oxide to said first-mentioned fluidized mass by withdrawing a stream of said solids and introducing the same into said gas stream prior to its entry into said first-mentioned reaction zone, passing said gas stream out of said second-mentioned reaction zone, cooling said withdrawn gas stream to a temperature not substantially higher than about 1000° F., treating said cooled gas stream to separate therefrom entrained solids, and returning said separated solids to said second-mentioned reaction zone.

5. A method for producing a hydraulic cement which comprises flowing a gas stream upwardly in a reaction zone through a mass of finely divided solids containing silica and calcium oxide to maintain the mass substantially in suspension in said stream, limiting the upward velocity of said gas stream to maintain the greater part of said mass of finely divided solids in a relatively dense pseudo-liquid phase in which the solid particles circulate at a high rate, and maintaining said fluidized mass of solids at a temperature substantially higher than 2000° F., withdrawing said gas stream from said first-mentioned reaction zone, introducing a mass of finely divided solids containing calcium carbonate into said withdrawn gas stream and passing the mixture of gas and solids upwardly into a second reaction zone to maintain the mass in said second reaction zone in said dense fluidized condition, maintaining said last-mentioned fluidized mass of solids at a temperature substantially lower than 2000° F. but sufficiently high to convert said calcium carbonate to calcium oxide, and transferring a portion of the solids comprising said second-mentioned fluidized mass including calcium oxide to said first-mentioned fluidized mass, removing a part of said fluidized mass of solids from said first-mentioned reaction zone, contacting said removed solids outside said first-mentioned reaction zone with a relatively cool gas stream to cool said solids and heat said gas stream, and flowing at least a part of said heated gas stream upwardly in said first-mentioned reaction zone as described, said portion of the solids transferred from said second-mentioned fluidized mass to said first-mentioned fluidized mass being admixed with said part of said heated gas stream outside of said reaction zones, and conveyed thereby into said first-mentioned fluidized mass.

6. A method for producing a compound of an oxide of a metal of group II and at least one oxide of a metal of groups III and IV which comprises flowing a gas stream upwardly in a reaction zone through a mass of finely divided solids containing said oxides to maintain the mass substantially in suspension in said stream, limiting the upward velocity of said gas stream to maintain the greater part of said mass of finely divided solids in a relatively dense pseudo-liquid phase in which the solid particles circulate at a high rate, maintaining said fluidized mass of solids at a temperature high enough to produce the desired reactions, removing a part of said fluidized mass of solids from said reaction zone independently of said gas stream, contacting said removed solids outside said reaction zone with a relatively cool gas stream to cool said solids and heat said gas stream, mixing at least a part of said heated gas stream with a preheated charge stream of said finely divided solids maintained at a temperature substantially higher than the temperature of said heated gas stream but below the temperature of said reaction zone, and passing said mixture of gas and solids upwardly into said reaction zone.

7. A method for producing a compound of an oxide of a metal of group II and at least one oxide of a metal of groups III and IV which comprises flowing a gas stream at a velocity of 0.1 to 10 feet per second upwardly in a reaction zone through a mass of finely divided solids containing said oxides to maintain the mass substantially in suspension in said stream, the greater part of said mass of finely divided solids being maintained in the lower portion of said reaction zone in a relatively dense pseudo-liquid phase in which the solid particles circulate at a high rate and the remaining part of said mass being maintained in the upper portion of said zone in a diffuse phase of considerably lower concentration of solids, maintaining said fluidized mass of solids at a temperature in the range of about 2000 to 2650° F., withdrawing said gas stream from said first-mentioned reaction zone, introducing a mass of finely divided solids containing a carbonate of a metal of group II into said withdrawn gas stream and then passing the mixture of gas and solids upwardly into a second reaction zone to maintain the mass in said second reaction zone in said dense fluidized condition, maintaining said last-mentioned fluidized mass of solids at a temperature substantially lower than the temperature maintained in said first-mentioned fluidized mass but sufficiently high to convert said metal carbonate to the corresponding metal oxide, and transferring a portion of the solids comprising said second-mentioned fluidized mass including said last-mentioned metal oxide to said first-mentioned fluidized mass.

8. A method for producing a compound of an oxide of a metal of group II and at least one oxide of a metal of groups III and IV which comprises flowing a gas stream at a velocity of 0.1 to 10 feet per second upwardly in a reaction zone through a mass of finely divided solids containing said oxides to maintain the mass substantially in suspension in said stream, the greater part of said mass of finely divided solids being maintained in the lower portion of said reaction zone in a relatively dense pseudo-liquid phase in which the solid particles circulate at a high rate and the remaining part of said mass being maintained in the upper portion of said zone in a diffuse phase of considerably lower concentration of solids, maintaining said fluidized mass of solids at a temperature in the range of about 2000 to 2650° F., withdrawing said gas stream from said first-mentioned reaction zone, introducing a mass of finely divided solids containing a carbonate of a metal of group II into said withdrawn gas stream and passing the mixture of gas and solids upwardly in a second reaction zone to maintain the mass in said second reaction zone in said dense fluidized condition, maintaining said last-mentioned fluidized mass of solids at a temperature substantially lower than the temperature maintained in said first-mentioned fluidized mass but sufficiently high to convert said metal carbonate to the corresponding metal oxide, withdrawing a portion of the solids comprising said second-mentioned fluidized mass including said last-mentioned metal oxide and introducing the same into said gas stream prior to its entry into said first-mentioned reaction zone.

9. A method for producing a compound of an oxide of a metal of group II and at least one oxide of a metal of groups III and IV which comprises flowing a gas stream upwardly in a reaction zone through a mass of finely divided solids containing said oxides to maintain the mass substantially in suspension in said stream, limiting the upward velocity of said gas stream to maintain the greater part of said mass of finely divided solids in a relatively dense pseudo-liquid phase in which the solid particles circulate at a high rate, maintaining said fluidized mass of solids at a temperature in the range of about 2000 to 2650° F., withdrawing said gas stream from said first-mentioned reaction zone, introducing a mass of finely divided solids containing a carbonate of a metal of group II into said withdrawn gas stream and then passing the mixture of gas and solids into a second reaction zone, wherein the mass in maintained in said dense fluidized condition, maintaining said last-mentioned fluidized mass of solids at a temperature substantially lower than the temperature maintained in said first-mentioned fluidized mass but sufficiently high to convert said metal carbonate to the corresponding metal oxide, removing a part of the fluidized mass of solids from said first-mentioned reaction zone, contacting said removed solids outside said reaction zone with a relatively cool gas stream to cool said solids and heat said stream, withdrawing a portion of the solids comprising said second-mentioned fluidized mass including said last-mentioned metal oxide and introducing the same into a part of said last-mentioned heated gas stream, passing said solids with said gas stream upwardly into said first-mentioned reaction zone as described, and combining another part of said last-mentioned heated gas stream with said gas stream emerging from said first-mentioned reaction zone prior to passage thereof into said second-mentioned reaction zone as described.

10. A method as in claim 5 in which said fluidized solids removed from said first-mentioned reaction zone are introduced into said cool gas stream and are then conveyed thereby upwardly into a cooling zone wherein said solids comprising said hydraulic cement are cooled while being maintained as a mass in said dense fluidized condition.

11. A method for producing a hydraulic cement comprising the steps of passing a mass of finely divided solids containing silica and calcium carbonate stage-wise through a series of zones including, in order, a preheating zone a calcining zone wherein said calcium carbonate is converted to the oxide, a reaction zone wherein the desired reaction is carried out, and a cooling zone, countercurrent to a stream of gas flowing stage-wise through said series of zones in reverse order, said gas stream passing upwardly in each zone through a mass of said finely divided solids at a velocity suitable to maintain the greater part of said mass suspended in said gas stream in a relatively dense pseudo-liquid phase, the finely divided solids prior to their entry into each of said preheating, calcining and reaction zones being introduced into the gas stream discharging from the next following zone, and the finely divided solids prior to entry into said cooling zone being introduced into the feed stream of said gas, said gas streams conveying said solids upwardly into said zones.

12. A method for producing a compound of an oxide of a metal of group II and at least one oxide of a metal of groups III and IV which comprises the steps of passing a mass of finely divided solids containing at least one oxide of a metal of groups III and IV and a carbonate of a metal of group II stage-wise through a series of zones including, in order, a preheating zone, a reaction zone wherein said carbonate is converted to the corresponding oxide, a second reaction zone wherein the desired reaction is carried out, and a cooling zone, countercurrent to a stream of gas flowing stage-wise through said series of zones in reverse order, said gas stream passing upwardly in each zone through a mass of said finely divided solids at a velocity suitable to maintain the greater part of said mass suspended in said gas stream in a relatively dense pseudo-liquid phase, the finely divided solids prior to their entry into each of said preheating, calcining and reaction zones being introduced into the gas stream discharging from the next following zone, and the finely divided solids prior to entry into said cooling zone being introduced into the feed stream of said gas, said gas streams conveying said solids into said zones.

13. A method as in claim 12 in which said zones are maintained at progressively increasing pressures in the order recited, and the solids prior to their introduction into the gas stream entering each zone are passed downwardly in an elongated confined path to increase the static pressure therein sufficiently to effect the injection of said solids into said gas stream.

14. A method as in claim 13 in which said elongated confined paths are constricted at their discharge ends to provide predetermined fixed rates of solids discharge.

15. A method as in claim 14 including the steps of injecting aerating gas into said elongated confined paths and adjusting the flow of aerating gas into each of said paths to produce a solids concentration therein suitable to provide a desired rate of solids discharge through said constrictions.

ROBERT PYZEL.

REFERENCES CITED

The following references are of record in the file of this patent:

UNITED STATES PATENTS

| Number | Name | Date |
|---|---|---|
| 371,715 | Sonnet | Oct. 18, 1887 |
| 1,536,702 | Chase | May 5, 1925 |
| 1,557,873 | Pike | Oct. 20, 1925 |
| 1,746,294 | Tyler | Feb. 11, 1930 |
| 1,828,270 | Anderson | Oct. 20, 1931 |
| 2,300,042 | Caldwell | Oct. 27, 1942 |
| 2,409,707 | Roethell | Oct. 22, 1946 |